(12) United States Patent
Kang

(10) Patent No.: US 11,962,025 B2
(45) Date of Patent: Apr. 16, 2024

(54) FIRE-RETARDANT INSULATION SUITABLE FOR BATTERY CELLS

(71) Applicant: DUPONT SAFETY & CONSTRUCTION, INC., Wilmington, DE (US)

(72) Inventor: Byoung Sam Kang, Midlothian, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 673 days.

(21) Appl. No.: 16/747,153

(22) Filed: Jan. 20, 2020

(65) Prior Publication Data

US 2020/0259144 A1 Aug. 13, 2020

Related U.S. Application Data

(60) Provisional application No. 62/802,916, filed on Feb. 8, 2019.

(51) Int. Cl.
| | |
|---|---|
| *H01M 10/0525* | (2010.01) |
| *B32B 19/06* | (2006.01) |
| *H01M 10/625* | (2014.01) |
| *H01M 10/658* | (2014.01) |
| *H01M 50/24* | (2021.01) |

(52) U.S. Cl.
CPC ............ *H01M 50/24* (2021.01); *B32B 19/06* (2013.01); *H01M 10/0525* (2013.01); *H01M 10/625* (2015.04); *H01M 10/658* (2015.04); *B32B 2262/101* (2013.01); *B32B 2307/304* (2013.01); *H01M 2220/20* (2013.01)

(58) Field of Classification Search
CPC ..... H01M 50/24; H01M 10/658; B32B 19/06; B32B 2262/101
See application file for complete search history.

(56) References Cited

U.S. PATENT DOCUMENTS

| | | | |
|---|---|---|---|
| 2,988,782 | A | 6/1961 | Guandique et al. |
| 2,999,788 | A | 9/1961 | Morgan |
| 3,063,966 | A | 11/1962 | Kwoler et al. |
| 3,227,793 | A | 1/1966 | Cipriani |

(Continued)

FOREIGN PATENT DOCUMENTS

| | | | | |
|---|---|---|---|---|
| CN | 103304255 | * | 9/2013 | ............ C04B 28/32 |
| CN | 207199806 U | * | 4/2018 | |

(Continued)

OTHER PUBLICATIONS

International Search Report and Written Opinion in International Application No. PCT/US2020/017431, dated May 14, 2020.

*Primary Examiner* — Amanda J Barrow

(57) ABSTRACT

A laminate useful as cell-to-cell battery insulation, the laminate having an insulating area and a periphery seal area, the insulating area comprising, in order: a first outer layer of paper comprising aramid material and mica; an inner layer comprising a felt or paper of inorganic short fibers; and a second outer layer of paper comprising aramid material and mica; the periphery seal area being void of the inner layer and being formed by adhering the first and second outer layers of paper to one another; wherein the periphery seal area extends around the periphery of the insulating area.

9 Claims, 1 Drawing Sheet

(56) References Cited

U.S. PATENT DOCUMENTS

| | | |
|---|---|---|
| 3,287,324 A | 11/1966 | Sweeny |
| 3,414,645 A | 12/1968 | Morgan, Jr. |
| 3,767,756 A | 10/1973 | Blades |
| 3,869,429 A | 3/1975 | Blades |
| 3,869,430 A | 3/1975 | Blades |
| 4,238,213 A | 12/1980 | Pallo et al. |
| 5,667,743 A | 9/1997 | Tai et al. |
| 5,714,421 A | 2/1998 | Olds et al. |
| 6,312,561 B1 * | 11/2001 | Forsten .................. D21H 13/26 162/157.2 |
| 2003/0129101 A1 * | 7/2003 | Zettel ................... B01D 53/885 422/177 |
| 2011/0126957 A1 * | 6/2011 | Wierzbicki ............ C09K 21/02 156/60 |
| 2012/0156956 A1 * | 6/2012 | Turpin ................... D21H 13/26 442/381 |
| 2014/0335398 A1 | 11/2014 | Partin et al. |
| 2015/0360452 A1 | 12/2015 | Duart et al. |
| 2017/0004908 A1 * | 1/2017 | Kang ...................... B32B 5/024 |
| 2017/0012275 A1 | 1/2017 | Gouzin et al. |
| 2017/0205117 A1 * | 7/2017 | Fernando ................ B32B 5/08 |
| 2017/0214103 A1 | 7/2017 | Onnerud et al. |
| 2017/0320298 A1 * | 11/2017 | Kang ....................... B32B 5/30 |
| 2018/0251278 A1 * | 9/2018 | Sasaki ................. B65D 65/406 |
| 2018/0309095 A1 | 10/2018 | Olchawski et al. |
| 2019/0002353 A1 * | 1/2019 | Eckel ...................... C08L 83/08 |
| 2019/0040276 A1 * | 2/2019 | Collis .................... C09D 5/18 |
| 2021/0197520 A1 * | 7/2021 | Li ............................ B32B 7/02 |

FOREIGN PATENT DOCUMENTS

| | | | | |
|---|---|---|---|---|
| CN | 107199806 | * | 6/2018 | |
| DE | 102010060832 | * | 5/2012 | ............... H01B 3/47 |
| EP | 3150897 A1 | | 4/2017 | |
| WO | 2017004187 A1 | | 1/2017 | |
| WO | 2017192424 A1 | | 11/2017 | |

* cited by examiner

FIRE-RETARDANT INSULATION SUITABLE FOR BATTERY CELLS

BACKGROUND OF THE INVENTION

Field of the Invention

This invention relates to a laminate useful as fire-retardant cell-to-cell insulation for batteries.

Description of Related Art

The growth of the use of lithium-ion and other batteries in electrical vehicles has been accompanied by an increase in dramatic battery failures involving overheating and fire. In particular, there is a need for fire-retardant insulation to separate battery cells and prevent overheating and hot spots in one cell from causing the entire battery pack to evolve into a thermal runaway condition that could result in fire or explosion. Therefore, insulation that is adequately thermally and dimensionally stable in flame is desired.

In addition, some proposed materials for such insulation have attributes that are undesirable to the manufacturers of batteries. Some insulating materials made with inorganic fibers have a high propensity to shed inorganic particles, which is undesirable in that they create dust and adhesion problems. Some insulating materials made with films or with polymer coatings are too smooth and will not accept two-side adhesive tape, which is sometimes used to attach and/or position the insulation in the battery cell.

What is needed are structures that can provide not only thermal insulation but also do not dramatically shrink when exposed to direct flames and that also do not have attributes such as shedding that are undesirable to the manufacturers of batteries.

BRIEF SUMMARY OF THE INVENTION

This invention relates to a laminate useful as cell-to-cell battery insulation, the laminate having an insulating area and a periphery seal area, the insulating area comprising, in order: a first outer layer of paper comprising aramid material and mica; an inner layer comprising a felt or paper of inorganic short fibers; and a second outer layer of paper comprising aramid material and mica; the periphery seal area being void of the inner layer and being formed by adhering the first and second outer layers of paper to one another; wherein the periphery seal area extends around the periphery of the insulating area.

DETAILED DESCRIPTION OF THE INVENTION

This invention relates to a laminate useful as cell-to-cell battery insulation, the laminate having an insulating area and a periphery seal area, the insulating area comprising, in order:

1) a first outer layer of paper comprising aramid material and mica;
2) an inner layer comprising a felt or paper of inorganic short fibers; and
3) a second outer layer of paper comprising aramid material and mica; the periphery seal area being void of the inner layer and being formed by adhering the first and second outer layers of paper to one another; wherein the periphery seal area extends around the periphery of the insulating area.

Multi-cell battery structures have battery cells positioned either in parallel or in series and are commonly known as battery blocks and battery packs. In these multi-cell battery structures, the heat energy from unusual thermal issues, such as faults or failures, in one cell can propagate to adjacent cells. If the thermal issues are severe enough they can propagate from cell-to-cell and cause a runaway thermal condition that can cascade to all the cells in the battery block or pack, resulting in a fire or even worse.

By "cell-to-cell insulation" it is meant materials that are inserted between individual battery cells in a multi-cell battery structure that provide thermal insulation; that is, they attempt to thermally isolate each battery cell and also retard the transfer of heat energy should the battery cell develop a thermal "hot spot" or have an unusual thermal issue such as a thermal runaway, which could result in an explosion.

Figure 1:
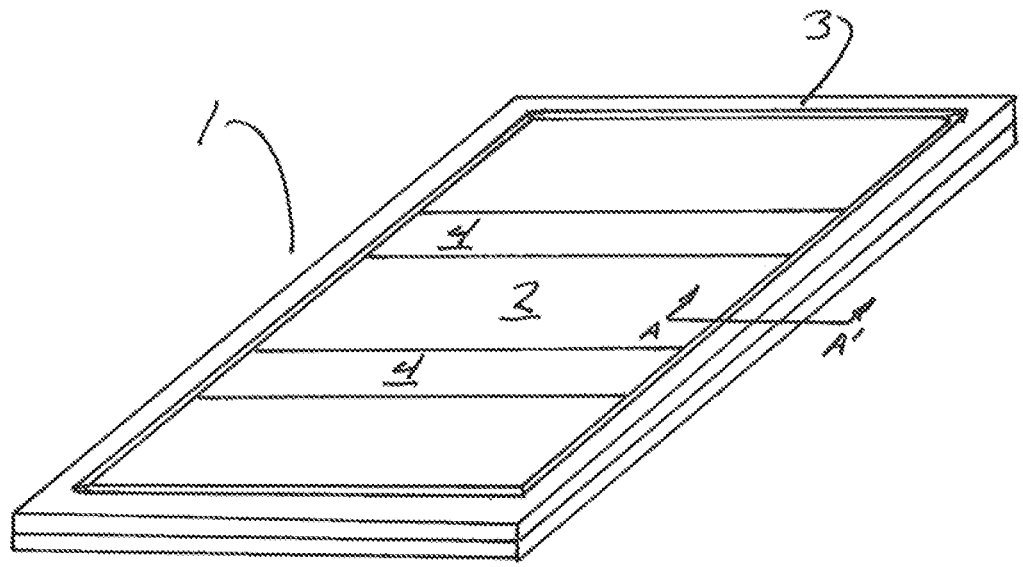
FIG. 1 illustrates one type of laminate having an insulating area and a periphery seal area, not drawn to scale.

FIG. 1. illustrates one version of the laminate 1 having a central insulating area 2 extending in the plane of the laminate to the periphery seal area 3; likewise, the periphery seal area 3 extends around the entire central insulating area. The insulating area provides the bulk of the insulation for the laminate, while the periphery seal area extends around the periphery of the insulating area and effectively seals the edges of the insulating area, encapsulating the materials of the inner layer inside the laminate. Also, one optional feature shown in FIG. 1. is one possible arrangement of two pieces of two-side tape 4 that are attached to the surface of the insulating area. The pieces of tape can be used to adhere the laminate to the battery cell or to position the laminate in the battery block or pack.

Figure 2:
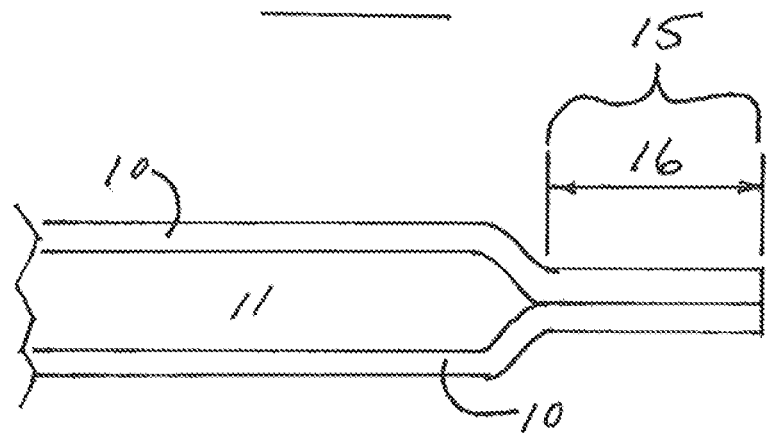
FIG. 2 illustrates a cross section A-A' of the laminate of FIG. 1 showing a part of the insulating area and the periphery seal area and individual layers in these areas, not drawn to scale.

The insulating area comprises, in order, a first outer layer of paper comprising aramid material and mica; an inner layer comprising a felt or paper of inorganic short fibers; and a second outer layer of paper comprising aramid material and mica. In some embodiments, one face of the inner layer is directly bound to a face of the first outer layer of paper and the opposing face of the inner layer is directly bound to a face of the second outer layer of paper. This embodiment is illustrated in FIG. 2, which is the cross-sectional detail A-A' from FIG. 1. The inner layer 11 is sandwiched between the first and second outer layers 10, forming the insulating area. Also, as shown in FIG. 2, in the periphery seal area as represented by the bracket 15, the first and second outer layers 10 extend past the outer edge or periphery of the inner layer and are adhered to one another. In some preferred embodiments, the first and second outer layers of paper are bound to the inner layer by use of a suitable adhesive to form the insulating area, and the first and second outer layers of paper are also adhered to each other by a suitable adhesive, preferably the same adhesive. As shown in FIG. 2, the periphery seal area has a width dimension 16. The periphery seal area is continuous around the periphery of the insulating area, and preferably the width periphery seal area is maintained around the entire periphery of the insulating area; that is, it has an equal width on all sides. The periphery seal area is void of the inner layer; that is, the inner layer is not present in the periphery seal area.

This creates a structure wherein the inner layer is completely sealed within the laminate, without any part of the inner layer being present at the external edges of the laminate. This prevents any of the material from the inner layer from flaking off the external edge of the laminate while the laminate is being assembled in a battery block or pack. Such flaking of inorganic particles creates assembly problems in the form of dust particles that can that can deposit on surfaces, causing housekeeping issues, skin irritation, and other problems. In particular, the dust deposited on the surface of the laminate makes attaching materials to the laminate difficult. Such materials include the double-sided positioning tape 4 used by many manufacturers and illustrated in FIG. 1.

The periphery seal area should be wide enough to adequately seal-in the materials of the inner layer in the laminate to block the shedding of the inorganic matter in the inner layer. As shown in FIG. 2, the width dimension 16 from the outer edge of the laminate to the edge of the inner layer should also be adequate for the laminate to withstand handling during battery block or pack manufacture and subsequent use without the periphery seal being ruptured. In some embodiments, the periphery seal area extending around the entire insulating area has a width of 2 to 15 mm. In some embodiments, the periphery seal area extending around the entire insulating area has a width of 2 to 10 mm.

The first outer layer of paper comprises aramid material and mica, the aramid material being in the form of floc, fibrid, or mixtures thereof. In some embodiments, the first outer paper layer comprises 50 to 70 weight percent uniformly distributed mica and 30 to 50 weight percent aramid material, based on the total amount of mica and aramid material in the layer. In some embodiments, the first outer paper layer comprises 50 to 60 weight percent uniformly distributed mica and 40 to 50 weight percent aramid material, based on the total amount of mica and aramid material in the layer.

Similarly, the second outer layer of paper comprises aramid material and mica, the aramid material being in the form of floc, fibrid, or mixtures thereof. In some embodiments, the second outer paper layer comprises 50 to 70 weight percent uniformly distributed mica and 30 to 50 weight percent aramid material, based on the total amount of mica and aramid material in the layer. In some embodiments, the second outer paper layer comprises 50 to 60 weight percent uniformly distributed mica and 40 to 50 weight percent aramid material, based on the total amount of mica and aramid material in the layer.

In the laminate, the first and second outer layers of paper can have the same composition of aramid material and mica, or can vary between the ranges provided herein. In some preferred embodiments, the same paper is used for both the first and second outer layers of paper in the laminate.

It is believed that at least about 50 weight percent mica is needed in both the first and second outer paper layers for the layers to provide the minimum dimensional stability of those layers under flame conditions, as evidenced by minimal crack formation, shrinkage, and swelling of the first and second outer paper layers under flame. Also, while in the outer layers papers amounts of mica greater than 70 weight percent are useful from a fire-blocking and dimensional stability standpoint, it is believed that as the amount of mica in the outer papers increases above 70 weight percent the outer layers of paper have more propensity to themselves shed the mica, therefore in some applications of amounts of mica greater than 70 weight percent would be undesirable.

By uniformly distributed mica, it is meant the mica can be homogenously distributed throughout the thickness of the paper layer, or the mica can be uniformly areally distributed throughout a concentrated planar zone in the paper that is closer to one of the faces of the layer. Implicit in this definition is the mica is sufficiently distributed to provide the desired performance of the final laminate structure.

The mica can include muscovite or phlogopite mica, or blends thereof, and may be calcined or uncalcined mica. "Calcined mica" as used herein means mica that is obtained by heating natural mica to a high temperature (usually greater than 800° C., sometimes more than 950 ° C.). This treatment removes water and impurities and improves the temperature resistance of the mica. Calcined mica is normally used in the form of a flake particle and mica of the muscovite type is preferred. "Uncalcined mica" as used herein means mica that is essentially in pure natural form that has preferably been homogenized and purified to remove imperfections and impurities. Uncalcined mica can form a very porous mica layer due to the larger size of the natural mica flakes. The preferred mica used in the first outer layer of paper is calcined mica, due to its improved dielectric properties and corona resistance over uncalcined mica.

The first and second outer layers of paper can have a preferred thickness of from 0.02 to 0.25 mm and a basis weight of from 30 to 300 grams per square meter. In some embodiments, the first and second outer layers of paper can have a thickness of 0.03 to 0.1 mm. In some embodiments, the first and second outer layers of paper can have a basis weight of from 50 to 120 grams per square meter. In some most preferred embodiments, the first and second outer layers of paper have the same thickness and basis weight.

The inner layer comprises a felt or paper of inorganic short fibers. The phrase "felt or paper of inorganic short fibers" is meant to include consolidated materials made by forming a matted material of inorganic short fibers by a suitable method, like lay-down on a screen, and then applying pressure to consolidate the matted material into a felt or paper. In some embodiments, the felt or paper of inorganic short fibers used in the inner layer further comprises an organic or inorganic binder, and one useful organic binder is an acrylic binder.

In some embodiments, the inorganic short fibers can include polycrystal fiber, such as alumina fiber, and/or monocrystal fiber, such as wollastonite and potassium titanate fiber. Polycrystalline fiber has superior heat resistance because of its small crystals. Monocrystalline fiber is extremely high in strength because whisker-like fine fibers can be made.

In some embodiments, the felt or paper of inorganic short fibers of the inner layer comprises an alkaline-earth silicate wool and alumino-silicate wool. These wools are short inorganic fibers having a mixture of inorganic material. The inorganic material can include mixtures of two or more of silica, calcia, magnesia, alumina, titania, zirconia, trace amounts of other oxides. As used herein, alkaline-earth silicate wool is meant to include such things as calcium-silicate wool, calcium-magnesium-silicate wool and calcium-magnesium-zirconium-silicate wool. Alumino-silicate wool is meant to include wools made from kaolin fibers. One type of particularly useful felts or papers of inorganic short fibers useful for the inner layer are those sold under the names of Superwool® and K-Shield® by Morgan Advanced Materials. Especially useful are Superwool® papers made with binders and K-Shield® BF papers made from Kaowool® (kaolin) fibers that are made without a binder.

In the inner layer, the felt or paper of inorganic short fibers can have a preferred thickness of from 0.3 to 5 mm and a basis weight of from 36 to 400 grams per square meter, as measured per the test methods provided herein. In some embodiments, the felt or paper of inorganic short fibers can have a thickness of 0.5 to 2 mm. In some embodiments, the felt or paper of inorganic short fibers can have a basis weight of from 50 to 150 grams per square meter. In some most preferred embodiments, inner layer is a single layer of the felt or paper of inorganic short fibers.

The insulating area and a periphery seal area of the laminate have different thickness, with the insulating area being thicker due to the presence of the inner layer, and the periphery seal area being thinner due to the absence of the inner layer. In some embodiments, the insulating area of the laminate has a thickness of from about 0.35 mm to 5.5 mm. In some preferred embodiments, the insulating area of the laminate has a thickness of from about 0.85 to 4 mm. In some embodiments, the periphery seal area of the laminate has a thickness of from about 0.04 to 0.60 mm. In some preferred embodiments, the periphery seal area of the laminate has a thickness of from about 0.06 to 0.25 mm.

In some embodiments, the laminate has a total basis weight of from about 100 to 400 grams per square meter. If the insulating area and a periphery seal area of the laminate were separated, one would find the insulating area accounts for most of this basis weight; and by itself would have a basis weight of about 90 to 398 grams per square meter. Likewise, the narrow periphery seal by itself would have a basis weight of only about 2 to 10 grams per square meter.

The term "inorganic short fibers" is meant to include fibers made from techniques that include melting of inorganic materials and fiberization of that melt into fibers such as disclosed, for example in U.S. Pat. Nos. 4,238,213 and 5,714,421. Generally, these techniques form fibers having a distribution of sizes having lengths ranging from about 0.5 to 20 centimeters and diameters ranging from about 0.05 to 10 micrometers, with average fiber diameters being in the range of 1.5 to 3.5 micrometers.

Further, the manufacture of such fibers usually includes some quantity of "shot", which are generally spherical pieces of inorganic material that were not made into fibers in the fiber spinning process. Therefore, the term "inorganic short fibers" as used herein is understood to include both fibrous material and shot. This shot can be considered a defect in some applications, such as the use in battery insulation, as the shot can be shed along with the fibers from sheets of material. Therefore, lower amounts of shot in the inorganic short fibers are generally desirable. Inorganic short fibers containing 40 weight percent shot or less are preferred, and most especially preferred are inorganic fibers containing 30 weight percent shot or less.

The term aramid floc, as used herein, means aramid fibers having a short length and that are customarily used in the preparation of wet-laid sheets and/or papers. Typically, aramid floc has a length of from about 3 to about 20 millimeters. A preferred length of aramid floc is from about 3 to about 7 millimeters. Aramid floc is normally produced by cutting continuous fibers into the required lengths using well-known methods in the art.

The term aramid, as used herein, means aromatic polyamide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other supporting material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The preferred aramid is a meta-aramid. The aramid polymer is considered a meta-aramid when the two rings or radicals are meta oriented with respect to each other along the molecular chain. The preferred meta-aramid is poly (meta-phenylene isophthalamide)(MPD-I). U.S. Pat. Nos. 3,063,966; 3,227,793; 3,287,324; 3,414,645; and 5,667,743 are illustrative of useful methods for making aramid fibers that could be used to make aramid floc.

Alternatively, the aramid floc could be a para-aramid or an aramid copolymer. The aramid polymer is considered a para-aramid when the two rings or radicals are para oriented with respect to each other along the molecular chain. Methods for making para-aramid fibers are generally disclosed in, for example, U.S. Pat. Nos. 3,869,430; 3,869,429; and 3,767,756. One preferred para-aramid is poly(paraphenylene terephthalamide); and one preferred para-aramid copolymer is copoly(p-phenylene/3,4'diphenyl ester terephthalamide). The preferred aramid floc is a meta-aramid floc, and especially preferred is floc made from the meta-aramid poly(meta-phenylene isophthalamide)(MPD-I).

The term fibrids, as used herein, means very small, nongranular, fibrous or film-like particles with at least one of their three dimensions being of minor magnitude relative to the largest dimension. These particles are prepared by precipitation of a solution of supporting material using a non-solvent under high shear, as disclosed for example in U.S. Pat. Nos. 2,988,782 and 2,999,788. Aramid fibrids are non-granular film-like particles of aromatic polyamide having a melting point or decomposition point above 320° C. The preferred aramid fibrid is a meta-aramid fibrid, and especially preferred are fibrids made from the meta-aramid poly(meta-phenylene isophthalamide) (MPD-I).

Fibrids generally have a largest dimension length in the range of about 0.1 mm to about 1 mm with a length-to-width aspect ratio of about 5:1 to about 10:1. The thickness dimension is on the order of a fraction of a micron, for example, about 0.1 microns to about 1.0 micron. While not required, it is preferred to incorporate aramid fibrids into the layers while the fibrids are in a never-dried state.

The first and second outer layer of paper comprises aramid material being in the form of floc, fibrid, or mixtures thereof. When a mixture of floc and fibrids is used for the aramid, a preferred calculated weight ratio of floc to fibrid is in a range from 0.5 to 4.0 and more preferably 0.8 to 2.0.

The term layer, as used in the first outer layer of paper and the second outer layer of paper, preferably refers to a thin planar material of a specific composition. The term layer also refers to a paper made from a plurality of thin planar webs attached together wherein all the planar webs have the same composition. The term face refers to either of the two major surfaces of both the first and second outer paper layers, or either of the two major surfaces of the inner layer (i.e., one side or the other of the paper layer or inner layer).

The first and second outer layers of paper can be directly bound to the inner layer in the insulating area by use of a continuous or discontinuous layer of adhesive; while first and second outer layers of paper can be directly bound to one another in the periphery seal area by preferential use a continuous layer of adhesive. In one practice of making the laminate, each of the layers are made separately and then combined with a layer of adhesive provided in between, with the layers being, in order, the first outer layer of paper, the inner layer, and then the second outer layer of paper. Each of the first and second outer layers of paper can be made separately on a paper-making machine by providing an aqueous dispersion of the desired amount and proportion of mica and supporting material to the headbox and then wet-laying the composition as a web onto a papermaking wire. The wet web can then be dried on dryer drums to form a paper. Preferably the paper is then further calendered in the nip of a hot roll calender under pressure and heat, or by other means, to consolidate and densify the paper into a paper layer having the desired thickness. If desired, two or more lighter basis weight or thinner wet webs or papers of the same composition can be made separately and then calendered and consolidated together into a single paper layer to form each of the first and second outer layers of paper. In a preferred embodiment, each of the first and second outer layers of paper is calendered separately prior to being combined with the inner layer in the laminate structure.

In one preferred embodiment, to homogeneous and continuously bind a face of the each of a paper layer to a face of the support layer, a liquid adhesive is applied to at least one face of a layer in a relatively uniform manner. The adhesive can be applied to either a paper layer or the inner layer using any method that provides a uniform application of adhesive to one side of the layer; such methods include those that involve roll coating or blade coating or spray coating. Preferably the adhesive is applied to a uniform thickness, and the adhesive is continuous in the laminate structure.

One method of making the laminate is to cut the first and second outer layers of paper to the desired size dimensions (length and width, radius, etc.) and shape (rectangular, circular, etc.), preferably the same size and shape. The inner layer is then cut to its desired size and shape. Generally, this is the same shape but having smaller size dimensions such that when the laminate is formed, a periphery seal area can be formed that extends around the entire periphery of the insulating area (the area containing the inner layer). The layers and adhesive are preferably then pressed together, with the adhesive positioned in between the layers, to form the laminate, using any method that can press or consolidate the layers together to form the desired structure having no inner layer exposed at the edge of the laminate. From a practical standpoint, this is preferably done in a press having bosses to form a periphery seal area that extends around the entire periphery of the insulating area, or in a mold, etc. Conceivably, with proper registration of the layers, pressing methods could include nipping the layers (with adhesive between) in the nip(s) of a set of embossed calender rolls. This consolidates the layers into a laminate structure having the desired thickness and fully and directly binds the layers together.

In some preferred embodiments, the final laminate has an insulating area consisting of three layers plus the adhesive positioned between the layers; the inner layer having a first surface and a second surface, the first surface adhered with an adhesive to the first outer layer and the second surface adhered with an adhesive to the second outer layer. The final laminate further has a periphery seal consisting of the first and second outer layers adhered to one another with an adhesive.

Test Methods

The following test methods were used in the Examples provided below. Thickness was measured according to TAPPI 411 using 5 N/cm² weight and reported in mm. Unless otherwise designated, the thickness reported in the tables is the thickness of the insulating area.

Basis Weight was measured according to ASTM D 645 and ASTM D 645-M-96 and reported in g/m². Unless otherwise designated, the basis weight reported in the table is the basis weight of the laminate.

Tensile Strength was measured according to ASTM D 828-93 with 2.54 cm wide test specimens and a gage length of 18 cm and reported in N/cm. Unless otherwise designated, the tensile strength reported in the tables is the tensile strength of the insulating area.

Dielectric Strength was measured according to ASTM D149-97A and reported in kV/cm. Unless otherwise designated, the dielectric strength reported in the tables is the dielectric strength of the insulating area.

Thermal Conductivity was measured according to ASTM E 1530 and reported in W/m-K. Unless otherwise designated, the thermal conductivity reported in the tables is the thermal conductivity of the insulating area.

Thermal Performance Protection Test (TPP) is a measure of the flammability performance of fabrics and sheets of material, providing realistic conditions of an exposure to combined radiant and convective heat. A sample is subjected to circumstances typical for fires: a constant combination of 50% radiant heat and 50% convective heat, at a constant heat flux of 84 kW/m² (2 cal/cm²/sec). The test then measures the time that elapses and the amount of heat energy per surface area (TPP value) at which the temperature and energy transferred to the back of the fabric reaches a level that is equivalent to a second-degree burn, if the material was being worn. The TPP test method used is the test method that has been adopted by ISO as a test method standard (ISO 17492) with a heat flux exposure of 80 kW/m²; however, the US NFPA 1971 standard requires the ISO 17492 test to be carried out at a modified, increased heat flux exposure of 84 kW/m², and this higher heat flux was used herein. The nature of the TPP test is to direct the heat flux primarily at the insulating area, therefore the flammability performance being measured is primarily that of the insulating area.

EXAMPLE 1

A laminate was made having first and second outer layers of Nomex® Type 818 (T818) paper, available from E. I. du Pont de Nemours and Co., Wilmington, Del. (DuPont), and an inner layer of Superwool® Plus 332-E paper available from Morgan Advanced Materials, Augusta, Ga. Nomex® T818 paper is an aramid paper containing approximately 50 weight percent mica and 50 weight percent aramid materials, the aramid materials being approximately 25 percent floc and 75 percent fibrids. Nomex® T818 paper is a consolidated (calendered) paper having a thickness of 3 mils (0.076 mm). The Superwool® Plus 332-E paper is made from an alkaline-earth silicate wool and an acrylic binder and had a measured thickness of approximately 40 mils (1.0 mm).

The 3 mil Nomex® T818 paper was cut into two identical rectangular pieces. The Superwool® Plus paper was also cut into a rectangular piece, but both the length and width dimensions of the Superwool® Plus paper rectangle were 20 mm shorter than the Nomex® T818 paper rectangles. The Superwool® Plus paper rectangle was then sandwiched between the two Nomex® T818 paper rectangles and laminated using a spray-on flame-retardant acrylic adhesive to adhere the layers together. Care was taken that the Superwool® Plus paper rectangle was centered on the Nomex® T818 paper rectangle; its smaller dimensions leaving a 10-mm area extending around the laminate where the two Nomex® T818 paper rectangles were attached to one another. In other words, the width of the periphery seal area was 10 mm on all four sides of the rectangular laminate. The resulting laminate had an insulating area of Nomex® T818 paper/Superwool® Plus/Nomex® T818 paper and a periphery seal area of Nomex® T818 paper/Nomex® T818 paper. The resulting laminate provided a sealed structure with limited shedding potential.

When the laminate was subjected to the Thermal Performance Protection Test (TPP), its dimensional stability under flame was found to be acceptable without significant crack formation, shrinkage or swelling, indicating the laminate provides good flame blocking, and the improved shedding performance of the laminate should continue in a thermal event. Composition details are summarized in Table 1 and the physical and thermal properties (as described in the test methods) are shown in Table 2.

EXAMPLE 2

Example 1 was repeated except the 3 mil calendered Nomex® T818 papers were replaced with 7 mil (0.178 mm) Nomex® Type 819 (T819) paper which is also available from E. I. du Pont de Nemours and Co., Wilmington, Del. (DuPont). Nomex® T819 paper has the same composition as Nomex® T818 paper, but is not consolidated (calendered) and is therefore less dense. The resulting laminate provided a sealed structure with limited shedding potential.

When the laminate was subjected to the Thermal Performance Protection Test (TPP), its dimensional stability under flame was found to be acceptable without significant crack formation, shrinkage or swelling, indicating the laminate provides good flame blocking, and the improved shedding performance of the laminate should continue in a thermal event. Composition details are summarized in Table 1 and the physical and thermal properties (as described in the test methods) are shown in Table 2.

EXAMPLE 3

Example 1 was repeated except the except Superwool® Plus 332-E paper was replaced with K-Shield® BF paper, which is also available from Morgan Advanced Materials, Augusta, Ga.). The K-Shield® BF paper is made from an alumino-silicate wool without a binder had a measured thickness of approximately 40 mils (1.0 mm). The resulting laminate provided a sealed structure with limited shedding potential.

When the laminate was subjected to the Thermal Performance Protection Test (TPP), its dimensional stability under flame was found to be acceptable without significant crack formation, shrinkage or swelling, indicating the laminate provides good flame blocking, and the improved shedding performance of the laminate should continue in a thermal event. Composition details are summarized in Table 1 and the physical and thermal properties (as described in the test methods) are shown in Table 2.

EXAMPLE 4

Example 2 was repeated except the except Superwool® Plus 332-E paper was replaced with K-Shield® BF paper, which is also available from Morgan Advanced Materials, Augusta, Ga.). The resulting laminate provided a sealed structure with limited shedding potential.

When the laminate was subjected to the Thermal Performance Protection Test (TPP), its dimensional stability under flame was found to be acceptable without significant crack formation, shrinkage or swelling, indicating the laminate provides good flame blocking, and the improved shedding performance of the laminate should continue in a thermal event. Composition details are summarized in Table 1 and the physical and thermal properties (as described in the test methods) are shown in Table 2.

COMPARATIVE EXAMPLE A

Example 1 was repeated except the 3 mil calendered Nomex® T818 papers was replaced with 3 mil Nomex® Type 416 (T16) paper, which is also available from E. I. du Pont de Nemours and Co., Wilmington, Del. (DuPont). Nomex® T416 paper contains only aramid materials; that is, it contains no mica.

When compared to the laminates made in Examples 1 to 4, the laminate of Comparative Example A showed poor dimensional stability under flame during TPP test as evidenced by excessive crack formation and significant shrinkage and swelling of the laminate. This causes poor flame blocking and resulted in lower duration in 2nd degree burn test. Composition details are summarized in Table 1 and the physical and thermal properties (as described in the test methods) are shown in Table 2.

TABLE 1

| Ex. | Structure | Each Outer Layer | | Inner Layer |
|---|---|---|---|---|
| | | Mica (nominal wt %) | Aramid (nominal wt %) | $SiO_2/CaO/MgO/Al_2O_3$ (nominal wt %) |
| 1 | Nomex ® T818/ Superwool ®/ Nomex ® T818 | 50 | 50 | 68/26/6/0 |
| 2 | Nomex ® T819/ Superwool ®/ Nomex ® T819 | 50 | 50 | 68/26/6/0 |
| 3 | Nomex ® T818/ K-Shield ®/ Nomex ® T818 | 50 | 50 | 48/0/0/52 |
| 4 | Nomex ® T819/ K-Shield ®/ Nomex ® T819 | 50 | 50 | 48/0/0/52 |
| A | Nomex ® T416/ Superwool ®/ Nomex ® T416 | 0 | 100 | 68/26/6/0 |

TABLE 2

| Properties | Examples and Comparative Example | | | | |
|---|---|---|---|---|---|
| | 1 | 2 | 3 | 4 | A |
| Thickness (mm) | 1.0 | 1.2 | 1.1 | 1.3 | 0.9 |
| Basis Weight (g/m$^2$) | 280 | 284 | 281 | 285 | 265 |
| Tensile Strength (MPa) | 2.9 | 1.2 | 2.6 | 1.2 | 7.2 |
| Elongation (%) | 2.5 | 2.3 | 2.3 | 2.3 | 11 |
| Dielectric Strength (kV/cm) | 340 | 290 | 330 | 280 | 250 |
| Thermal Conductivity (W/m-K) | 0.037 | 0.031 | 0.036 | 0.030 | 0.038 |
| TPP 2$^{nd}$ degree burn (seconds) | 13.8 | 21.6 | 14.5 | 22.5 | 5.6 |
| TPP per unit thickness (sec/mm) | 13.8 | 18.0 | 13.2 | 17.3 | 6.2 |

What is claimed is:
1. A laminate useful as cell-to-cell battery insulation, the laminate having an insulating area and a periphery seal area, the insulating area comprising, in order:
   1) a first outer layer of paper comprising aramid material and mica;

2) an inner layer comprising a felt or paper of inorganic short fibers;

wherein inorganic short fibers are inorganic fibers having a distribution of sizes having lengths ranging from about 0.5 to 20 centimeters and diameters ranging from about 0.05 to 10 micrometers that can additionally contain shot, and 3) a second outer layer of paper comprising aramid material and mica;

the periphery seal area being void of the inner layer and being formed by adhering the first and second outer layers of paper to one another;

wherein the periphery seal area extends around the periphery of the insulating area, and wherein the first outer layer of paper and the second outer layer of paper each comprises 50 to 70 weight percent uniformly distributed mica and 30 to 50 weight percent aramid material, the aramid material being in the form of floc, fibrid, or mixtures thereof;

wherein the weight percentages recited are each based on a total weight of the respective layer.

2. The laminate of claim 1, wherein the first outer layer of paper or the second outer layer of paper each comprises 50 to 60 weight percent uniformly distributed mica and 40 to 50 weight percent aramid material, the aramid material being in the form of floc, fibrid, or mixtures thereof, wherein the weight percentages recited are each based on a total weight of the respective layer.

3. The laminate of claim 2, wherein the first outer layer of paper and the second outer layer of paper each comprises 50 to 60 weight percent uniformly distributed mica and 40 to 50 weight percent aramid material, the aramid material being in the form of floc, fibrid, or mixtures thereof;

wherein the weight percentages recited are each based on a total weight of the respective layer.

4. The laminate of claim 1, wherein the felt or paper of inorganic short fibers of the inner layer is an alkaline-earth silicate wool.

5. The laminate of claim 1, wherein the inner layer further comprises a binder.

6. The laminate of claim 1, wherein the periphery seal area extending around the the periphery of the insulating area has a width of 2 to 15 mm.

7. The laminate of claim 6, wherein the periphery seal area extending around the the periphery of the insulating area has a width of 2 to 10 mm.

8. The laminate of claim 1, wherein the insulating area consists of the first outer layer of paper, the inner layer, the second outer layer of paper, a first adhesive, and a second adhesive; wherein the inner layer has a first surface and a second surface, the first surface adhered with the first adhesive to the first outer layer of paper and the second surface adhered with the second adhesive to the second outer layer of paper.

9. The laminate of claim 1, wherein the periphery seal area consists of the first outer layer of paper and the second outer layer of paper adhered to one another with an adhesive.

* * * * *